(12) United States Patent
Bailly et al.

(10) Patent No.: US 8,414,439 B2
(45) Date of Patent: Apr. 9, 2013

(54) TRANSMISSION DEVICE FOR A VEHICLE, HAVING A VARIATOR

(75) Inventors: Gerhard Bailly, Friedrichshafen (DE);
Thomas Ratzmann, Meckenbeuren (DE); Karl Grad, Ruderting (DE);
Juergen Pohlenz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/679,518

(22) PCT Filed: Aug. 15, 2008

(86) PCT No.: PCT/EP2008/060755
§ 371 (c)(1),
(2), (4) Date: Mar. 23, 2010

(87) PCT Pub. No.: WO2009/047033
PCT Pub. Date: Apr. 16, 2009

(65) Prior Publication Data
US 2010/0197440 A1     Aug. 5, 2010

(30) Foreign Application Priority Data

Oct. 2, 2007  (DE) .......................... 10 2007 047 194
Jul. 16, 2008  (DE) .......................... 10 2008 040 447

(51) Int. Cl.
*F16H 47/04* (2006.01)
(52) U.S. Cl. ......................................... 475/72
(58) Field of Classification Search .................. 475/72, 475/73, 80, 81, 82, 83, 207, 214, 215, 216, 475/217, 218, 302, 338, 339, 340; 74/606 R
See application file for complete search history.

(56) References Cited

U.S. PATENT DOCUMENTS

| | | | |
|---|---|---|---|
| 2,543,584 A * | 2/1951 | Meinecke ..................... 475/72 |
| 2,583,656 A | 1/1952 | Lay | |
| 2,808,737 A | 10/1957 | Bullard, III | |
| 3,023,638 A | 3/1962 | Westbury et al. | |
| 3,204,486 A | 9/1965 | Lalio | |
| 3,212,358 A | 10/1965 | Lalio | |
| 3,580,107 A | 5/1971 | Orshansky, Jr. | |
| 3,601,981 A | 8/1971 | Ifield | |
| 3,626,787 A | 12/1971 | Singer | |
| 3,714,845 A | 2/1973 | Mooney, Jr. | |
| 3,834,164 A | 9/1974 | Ritter | |

(Continued)

FOREIGN PATENT DOCUMENTS

| | | |
|---|---|---|
| AT | 197 650 B | 10/1957 |
| DE | 1 069 978 | 11/1959 |

(Continued)

OTHER PUBLICATIONS

English translation of DE 10319252, Aug. 31, 2012, http://translationportal.epo.org.*

*Primary Examiner* — Roger Pang
(74) *Attorney, Agent, or Firm* — Davis & Bujold, PLLC

(57) ABSTRACT

A transmission device (1) for a vehicle having a variator (3) that has an axially longer length that the variator (3) is wider and deeper. The variator (3) comprises a planetary gear set (4), a manual gearbox unit (9) and a hydraulic system having an oil sump. Following installation in the vehicle, a longitudinal extension of the variator (3) is oriented at least approximately horizontally.

16 Claims, 9 Drawing Sheets

U.S. PATENT DOCUMENTS

| | | | | |
|---|---|---|---|---|
| 4,019,404 | A * | 4/1977 | Schauer | 475/82 |
| 4,121,479 | A | 10/1978 | Schauer | |
| 4,434,681 | A | 3/1984 | Friedrich et al. | |
| 4,446,756 | A | 5/1984 | Hagin et al. | |
| 4,563,914 | A | 1/1986 | Miller | |
| 4,776,233 | A | 10/1988 | Kita et al. | |
| 4,813,306 | A | 3/1989 | Kita et al. | |
| 4,976,664 | A | 12/1990 | Hagin et al. | |
| 5,071,391 | A | 12/1991 | Kita | |
| 5,186,692 | A * | 2/1993 | Gleasman et al. | 475/82 |
| 5,403,241 | A * | 4/1995 | Jarchow et al. | 475/72 |
| 5,421,790 | A | 6/1995 | Lasoen | |
| 5,643,122 | A | 7/1997 | Fredriksen | |
| 5,667,452 | A | 9/1997 | Coutant | |
| 5,679,085 | A * | 10/1997 | Fredriksen et al. | 475/76 |
| 5,695,422 | A * | 12/1997 | Otten | 475/72 |
| 5,766,107 | A | 6/1998 | Englisch | |
| 5,803,856 | A * | 9/1998 | Iino et al. | 475/72 |
| 5,868,640 | A | 2/1999 | Coutant | |
| 5,890,981 | A | 4/1999 | Coutant et al. | |
| 5,894,907 | A * | 4/1999 | Peter | 180/374 |
| 6,029,542 | A | 2/2000 | Wontner | |
| 6,039,666 | A * | 3/2000 | Okuda et al. | 475/72 |
| 6,056,661 | A | 5/2000 | Schmidt | |
| 6,474,426 | B2 * | 11/2002 | Yamamoto et al. | 180/9.44 |
| 6,485,387 | B1 | 11/2002 | Goodnight et al. | |
| 6,592,485 | B2 | 7/2003 | Otten et al. | |
| 6,761,658 | B1 | 7/2004 | Stettler, Jr. | |
| 7,097,583 | B2 | 8/2006 | Lauinger et al. | |
| 7,354,368 | B2 | 4/2008 | Pollman | |
| 7,448,976 | B2 | 11/2008 | Hiraki et al. | |
| 7,892,130 | B1 * | 2/2011 | Gollner et al. | 475/73 |
| 2002/0042319 | A1 | 4/2002 | Otten et al. | |
| 2003/0089107 | A1 | 5/2003 | Tani | |
| 2003/0150662 | A1 | 8/2003 | Tani | |
| 2003/0166430 | A1 | 9/2003 | Folsom et al. | |
| 2004/0242357 | A1 | 12/2004 | Ishizaki | |
| 2006/0094554 | A1 | 5/2006 | Schmidt | |
| 2006/0276291 | A1 | 12/2006 | Fabry et al. | |
| 2007/0277520 | A1 | 12/2007 | Gollner | |
| 2007/0281815 | A1 | 12/2007 | Gollner | |
| 2008/0085801 | A1 | 4/2008 | Sedoni et al. | |
| 2008/0103006 | A1 | 5/2008 | Pollman et al. | |
| 2008/0214349 | A1 | 9/2008 | Liebherr et al. | |
| 2008/0214351 | A1 | 9/2008 | Katayama et al. | |
| 2009/0270212 | A1 | 10/2009 | Ueda et al. | |
| 2010/0056318 | A1 | 3/2010 | Glockler | |

FOREIGN PATENT DOCUMENTS

| | | |
|---|---|---|
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

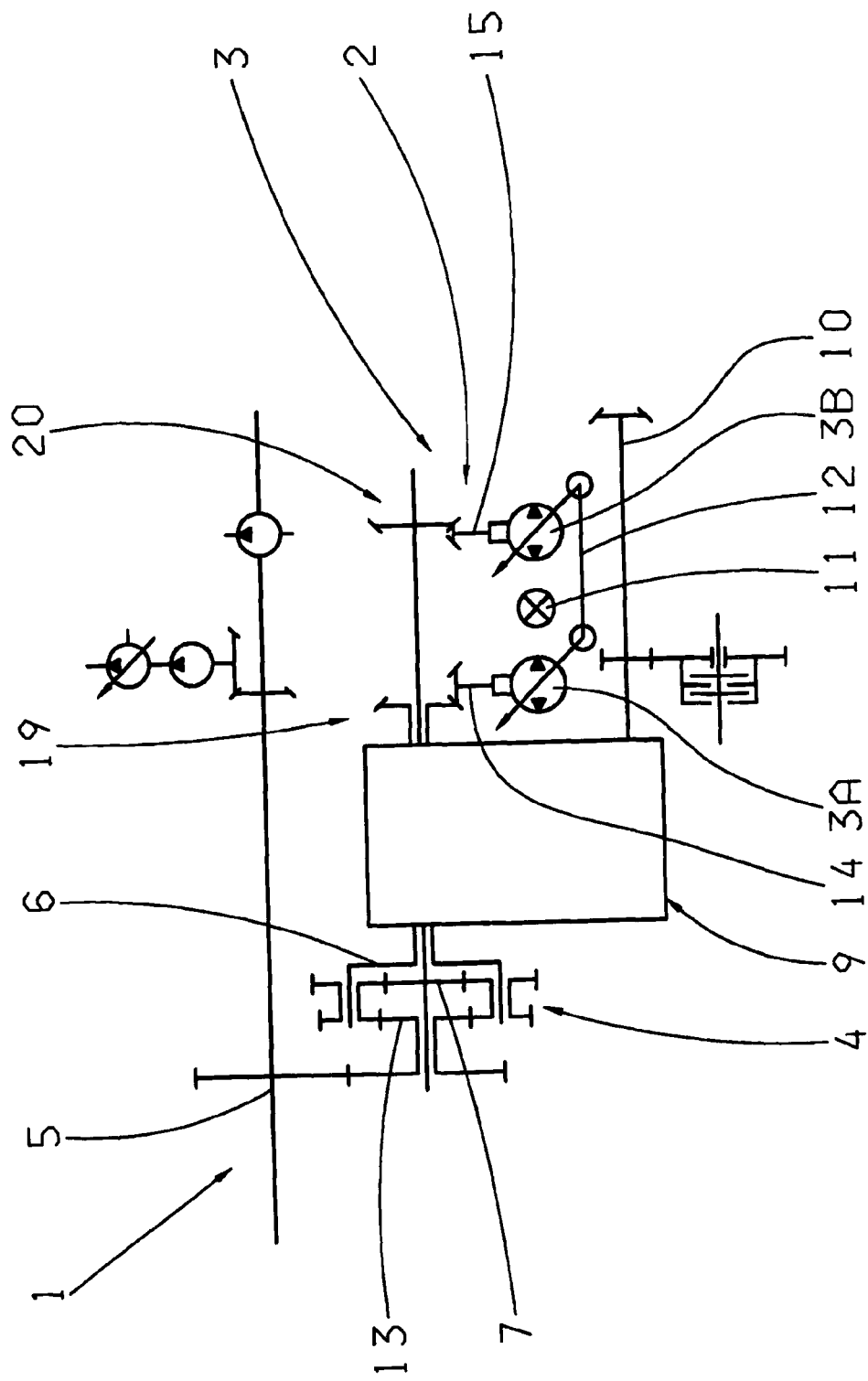

TRANSMISSION DEVICE FOR A VEHICLE, HAVING A VARIATOR

This application is a National Stage completion of PCT/EP2008/060755 filed Aug. 15, 2008, which claims priority from German patent application serial no. 10 2008 040 447.0 filed Jul. 16, 2008 and German patent application serial no. 10 2007 047 194.9 filed Oct. 2, 2007.

FIELD OF THE INVENTION

The invention relates to a transmission device for a vehicle, having a variator.

BACKGROUND OF THE INVENTION

A hydrostatic-mechanical tractor transmission with an infinitely variable hydrostatic drive is already known from DE 10 2006 025 348 A1. The hydrostatic drive has a hydrostatic pump driven by an internal combustion engine and a hydraulic motor driven by the pump. The pump and the hydraulic motor are forcibly coupled by way of a single, common pivotable part and can be adjusted in such a manner that the pump can be pivoted between a minimum angle and a maximum angle, while the motor simultaneously pivots synchronously between a maximum pivot angle and a minimum angle. The pump is designed for a single pumping direction of the volume flow. A mechanical range-change transmission having several gear steps, that can be shifted via a clutch, is connected downstream.

A transmission device that has power spitting ability is additionally known from DE 19 52 966 A, comprising a variator, a double planetary gear set and a manual gearbox for implementing several operating ranges. The pump device and the motor device of the variator designed as a hydrostatic unit can be adjusted by way of a common yoke.

SUMMARY OF THE INVENTION

The present invention is based on the object of refining transmission devices known from prior art in such a manner that the variator can be easily disassembled from the installation position thereof.

The transmission device according to the invention for a vehicle, has a variator that is longer than it is wide and deep, comprising a planetary gear set, a manual gearbox and a hydraulic system having an oil sump. The variator is oriented in the vehicle in the installation position with the longitudinal extension thereof arranged at least approximately horizontally.

As a function of the spatial arrangement of the variator relative to the planetary gear set and the manual gearbox, the variator can easily be withdrawn upward relative to the top of the vehicle, downward relative to the bottom of the vehicle, forward relative to a forward travel direction, in the direction of a vehicle rear axle, or laterally out of a plug-in connection and from teeth connecting the variator to additional transmission components, and is thus easily disassembled, while requiring a small amount of space for the transmission device at the same time.

In an advantageous refinement of the transmission device according to the invention, the variator is arranged at least in certain areas underneath an oil level of the oil sump, in order to be able to disassemble the variator easily from under the vehicle. In order to avoid power loss in operation due to oil churning of the rotating parts of the variator, the area of the variator lying below the oil level is isolated by bulkheads from the hydraulic fluid of the oil sump.

Alternatively, the variator is arranged in an advantageous embodiment of the transmission device above an oil level of the oil sump in order to avoid churning losses.

Another embodiment of the transmission device according to the invention is configured with a variator designed as a hydrostatic device to conduct as much power as possible from a drive machine of a vehicle, via the transmission device, to an output shaft of the vehicle, while achieving a small space requirement at the same time.

In a preferred embodiment of the transmission device according to the invention, the hydrostatic device is configured in a bent-axis design or a swash plate design, each having at least one adjustment unit.

A cost-effective refinement of the transmission device according to the invention characterized by a simple design is implemented with a hydrostatic unit having at least one fixed displacement unit.

In another embodiment of the transmission device according to the invention, in which the hydrostatic device comprises at least one adjustable pump unit and at least one adjustable motor unit that are designed to be adjustable independently of one another, transmission ranges, each having infinitely variable gear ratios, that can be implemented by way of the variator, the planetary gear assembly and the manual gearbox are available with large ranges of ratios.

In an alternative embodiment of the transmission device according to the invention, the hydrostatic unit comprises at least one adjustable pump unit and at least one adjustable motor unit that are designed to be adjusted together. Thus the adjustment of the hydrostatic unit has a simpler design and can be produced more economically in comparison to the previously mentioned embodiment of the transmission device.

In an advantageous refinement of the transmission device according to the invention, the variator can be easily positioned in any desired manner relative to the planetary gear set and the manual gearbox, since the variator is connected in the area of a first shaft and in the area of a second shaft via a bevel gear drive to a respective shaft of the planetary gear set. The connection of the variator via the bevel gear drives offers the additional advantage that the operative connection of the variator to the planetary gear set and manual gearbox can be implemented using smaller gears than a connection of the variator via spur gear teeth.

In an advantageous refinement of the transmission device according to the invention, when installed the variator is arranged between an engine of the vehicle and the planetary gear set and manual gearbox. Thus the variator can easily be removed from a vehicle by pulling the variator in the forward direction if there is no lateral access to the transmission housing. Furthermore, the variator can also be easily removal from the underside of the vehicle, given corresponding accessibility, without additional disassembly of vehicle parts or tilting a vehicle cab.

In embodiments of the transmission device according to the invention having a small space requirement in the radial direction, either the variator is arranged between the planetary gear set and the manual gearbox unit, or the manual gearbox unit is arranged between the planetary gear set and the variator.

In an additional advantageous embodiment characterized by a small space requirement in the axial direction, the variator is arranged in the installed position thereof next to the planetary gear set and/or the manual gearbox unit relative to a travel direction of the vehicle, wherein the variator can be easily removed, with appropriate accessibility, by pulling it laterally out of a plug connection or from teeth connecting the variator to additional transmission components.

The introduction of rotating components of the variator into the oil sump of the transmission device according to the invention is completely avoided in an additional embodiment of the transmission device that is characterized by a small axial space requirement, for the installation of the variator and relative to a vertical vehicle axis above the planetary gear set and/or the manual gearbox, wherein this embodiment is particularly favorable in cases where additional available lateral installation space is limited, for example, due to the design of the vehicle frame. In addition it is easily possible to use oil flows of a variator designed as a hydrostatic unit, such as leaks, flushing oil or the like, to lubricate components of the transmission device that are arranged underneath the variator. With an appropriate arrangement of the transmission device according to the invention, it is also easily possible to remove the variator for servicing upward relative to the vertical axis of the vehicle by tilting the driver's cab of the vehicle designed with the transmission device according to the invention.

BRIEF DESCRIPTION OF THE DRAWINGS

Further advantages and advantageous refinements of the invention will be apparent from the claims and the exemplary embodiments described schematically with reference to the drawings, wherein, for purposes of clarity in the description, identical reference numbers are used for components identical in design or function.

Shown are:

FIG. 7 shows a gear diagram of a fourth exemplary embodiment of the transmission device according to the invention.

DETAILED DESCRIPTION OF THE PREFERRED EMBODIMENTS

Figure 1:
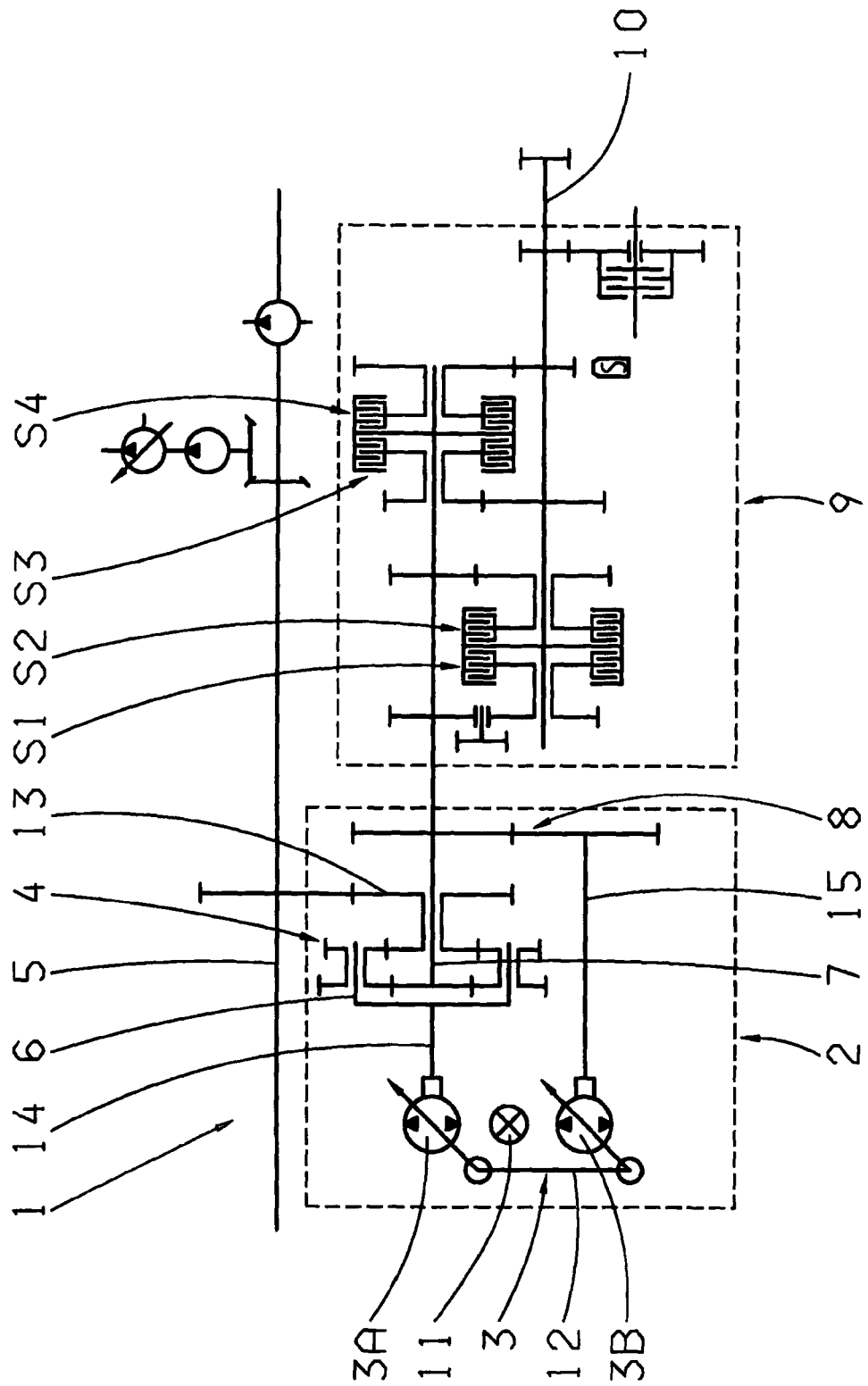
FIG. 1 shows a gear diagram of a first exemplary embodiment of the transmission device according to the invention.

FIG. 1 shows a gear diagram of a transmission device 1 having gear ratios that are continuously, variably adjustable that can be used, for example, in agricultural vehicles. In the present example, the transmission device 1 comprises three transmission ratio ranges or operating ranges for forward drive and one transmission ratio range for reverse drive, inside which ranges the ratio of the transmission device can be continuously adjusted, are provided by.

The continuously variable adjustment of the transmission ratio is made possible by a drive set 2 that comprises a variator 3 and a planetary gear set 4. The continuous adjustability of the rotational speed of the variator 3 is superimposed by means of the planetary gear set 4 with the rotational speed of a transmission input 5 coupled to the engine of a vehicle, the rotational speed being adjustable only to a limited extent. As a result of this superimposition, two shafts 6, 7 of the planetary gear set 4 having continuously variable rotational speeds are available in the region of the planetary gear set 4, wherein the first shaft 6 is designed as a planet carrier of the planetary gear set 4 and is coupled to an adjustable pump 3A of variator 3. The second shaft 7 is a sun gear of planetary gear set 4, which is operatively connected via spur gear teeth 8 to an adjustable motor 3B of variator 3. The pump 3A and motor 3B of the variator 3, which is implemented as a hydrostatic device, are each configured in a bent-axis design and can be pivoted about a pivot axis 11 via a common yoke 12.

The continuously variable drive set 2 is coupled to a manual gearbox unit 9 that is designed as a function of the efficiency of variator 5 and also as a function of the design of the planetary gear set 4. Power is transferred from the continuously variable drive set 2 to a transmission output shaft 10 via the manual gearbox unit 9. In addition, the required output rotational speeds in the various transmission ranges are implemented in the region of the manual gearbox unit 9.

The manual gearbox unit 9 is designed with four frictionally engaging shifting elements S1 to S4, wherein the operating ratio range for reverse drive is engaged in transmission device 1 when the first shifting element S1 is engaged. The shifting elements S2-S4 are provided for implementing the three operating ratio ranges for forward travel.

A second sun gear 13 of the planetary gear set 4 is connected to the transmission drive shaft 5. The variator shafts 14 and 15 are thus respectively coupled to a shaft 6, 7 of the planetary gear set 4, which have no direct connection to the transmission drive shaft 5. In addition, the variator shafts 14 and 15 are disposed axially parallel to the shafts 6, 7 of the planetary gear set 4.

In order to enable as simple a disassembly of the variator 3 as possible when service is needed and to avoid introducing the rotating parts of variator 3 into the oil sump of the transmission device 1 below an oil level 18, the variator, which is designed to be longer than it is wide and deep, is oriented at least substantially horizontally in the longitudinal extension thereof when installed in the vehicle, and above the oil level 18. Thereby drag losses and power losses caused by oil churning are eliminated easily without expensive internal partitions for the variator 3.

Figure 2:
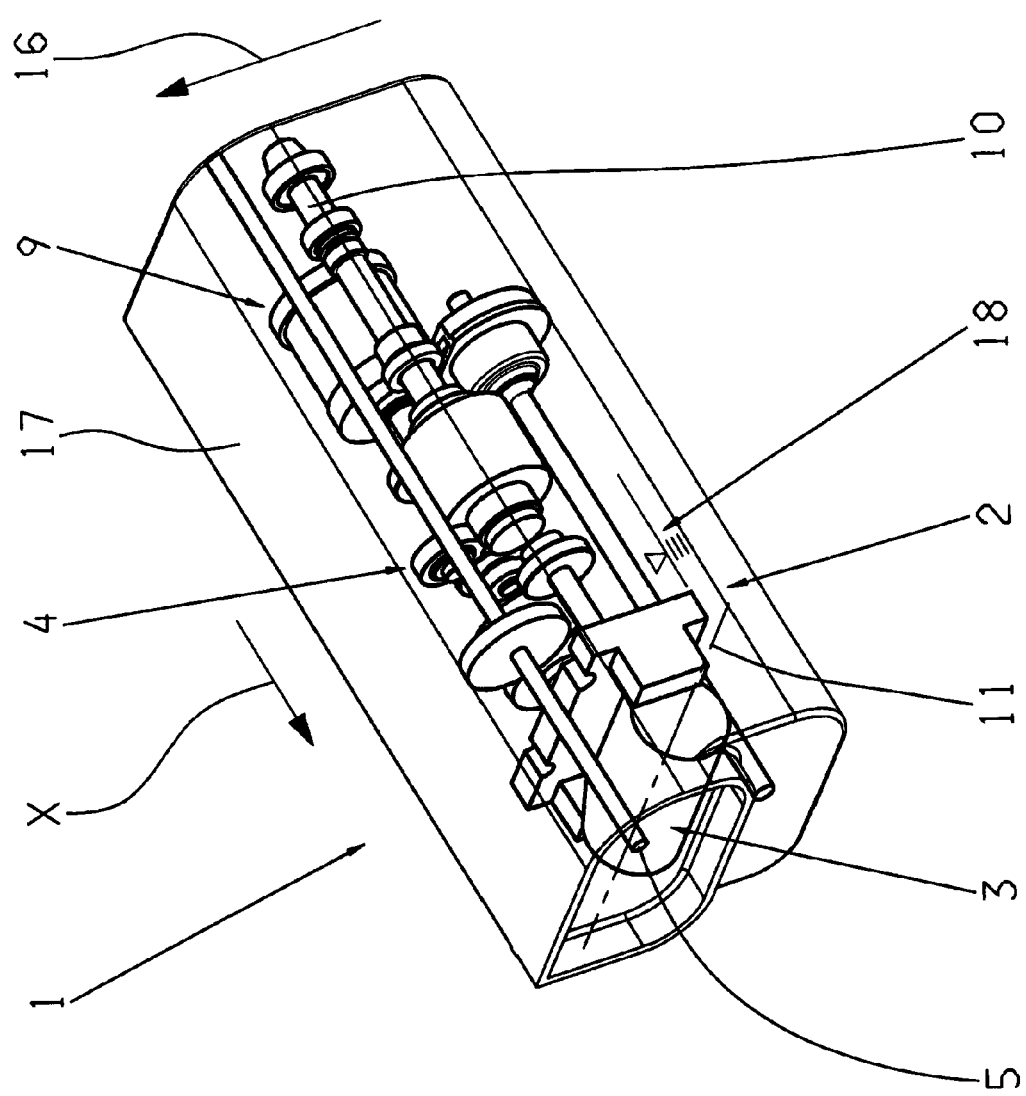
FIG. 2 shows a schematic three-dimensional side view of the transmission device according to FIG. 1.

In addition, the variator 3 is arranged upstream of the planetary gear set 4 and manual gearbox unit 9 in the forward travel direction of the vehicle, which is marked by the arrow X in FIG. 2. The transmission device 1 is characterized by an installation space requirement in the radial direction being smaller than a large axial length. Moreover, the variator 3 is easily disassembled because of the forward arrangement thereof in the forward travel direction X, wherein, depending on the respective design of the vehicle, the variator 3 can be removed from a vehicle frame 17 toward the front relative to a front vehicle axle, downward relative to a top side of a vehicle, or upward in the direction of a vertical vehicle axis 16. The vehicle frame 17 in addition to other vehicle components, limits the overall installation space in the vehicle available for the transmission device 1.

If the variator 3 is arranged at least in certain regions below an oil level 18 of the transmission device 1, the variator 3 must be isolated by suitable internal partitions IP from the hydraulic fluid arranged in the oil sump of the transmission device 1 in order to avoid so-called churning losses during operation of the transmission device 1 and thus avoid reduction of the overall efficiency of the transmission device 1 in a simple manner.

Figure 3:
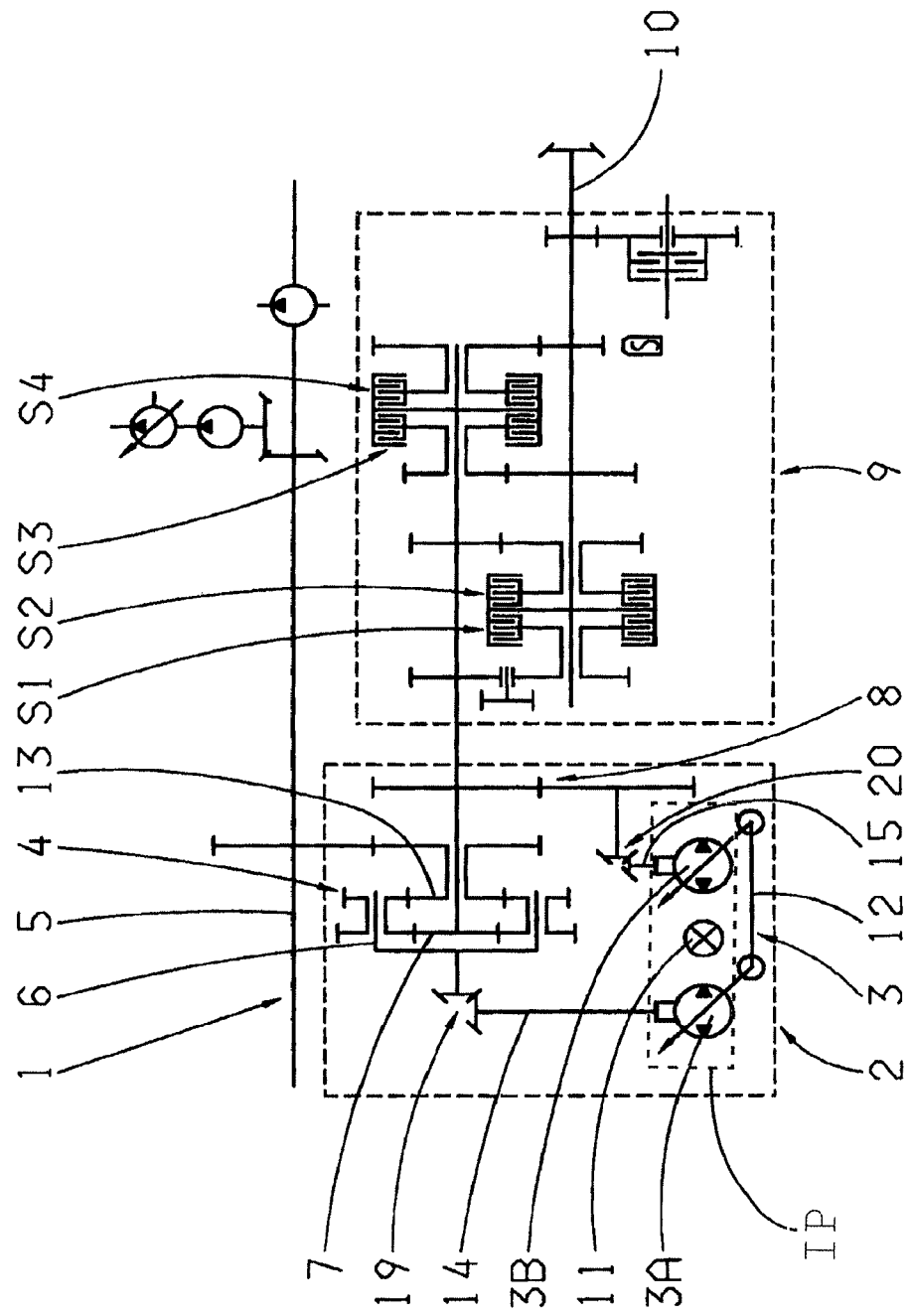
FIG. 3 shows a gear diagram of a second exemplary embodiment of the transmission device according to the invention.

FIG. 3 shows a gear diagram of a second exemplary embodiment of the transmission device 1, in which the two variator shafts 14 and 15 are each connected via so-called angle drives 19 and 20 to the shafts 6 and 7 of the planetary gear set 4, wherein each angle drive 19, 20 is formed by meshing bevel gears or bevel gear teeth.

Figure 3A:
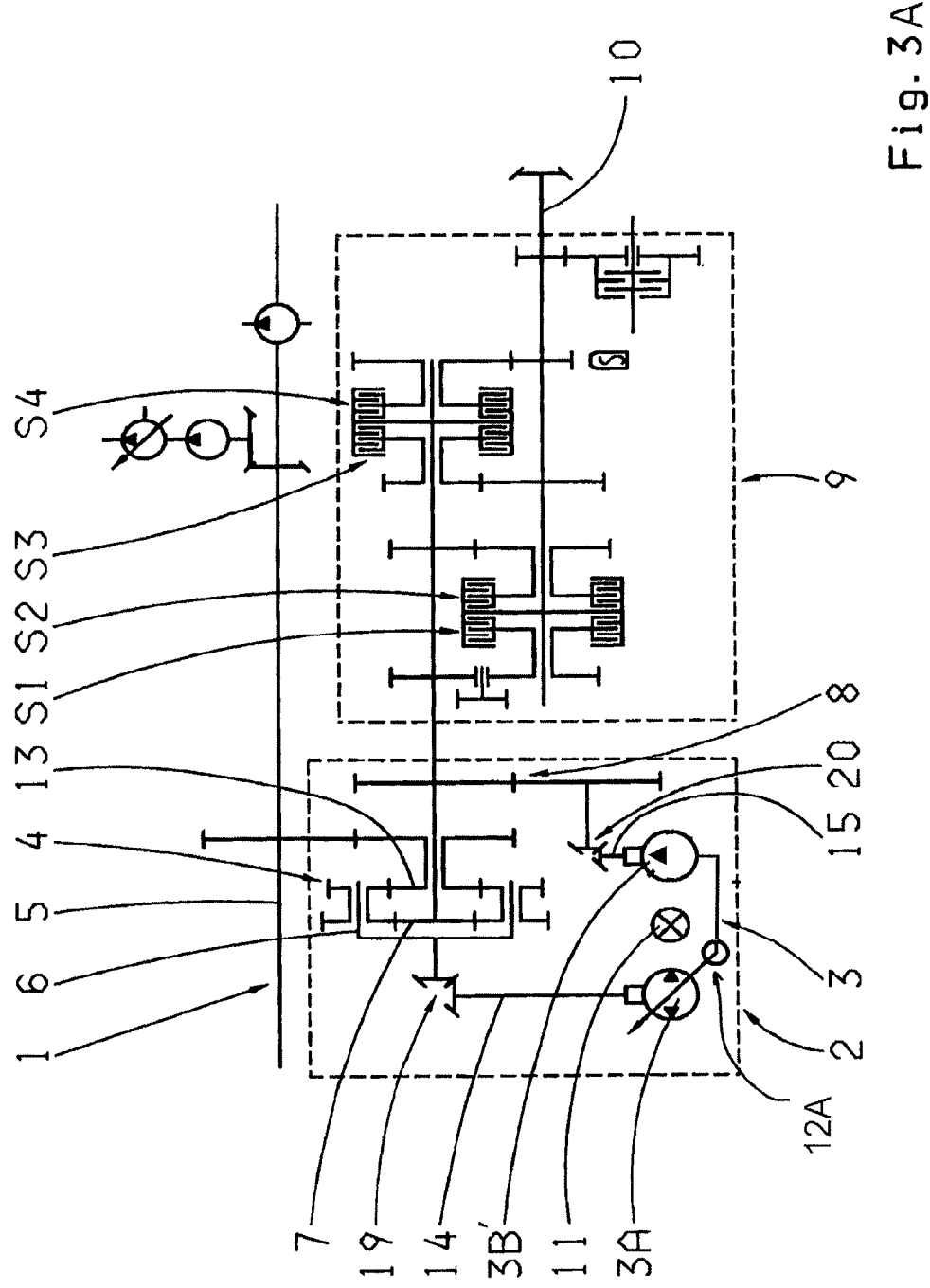
FIG. 3A shows a gear diagram of a first variation of the second exemplary embodiment of the transmission device according to the invention.
Figure 3B:
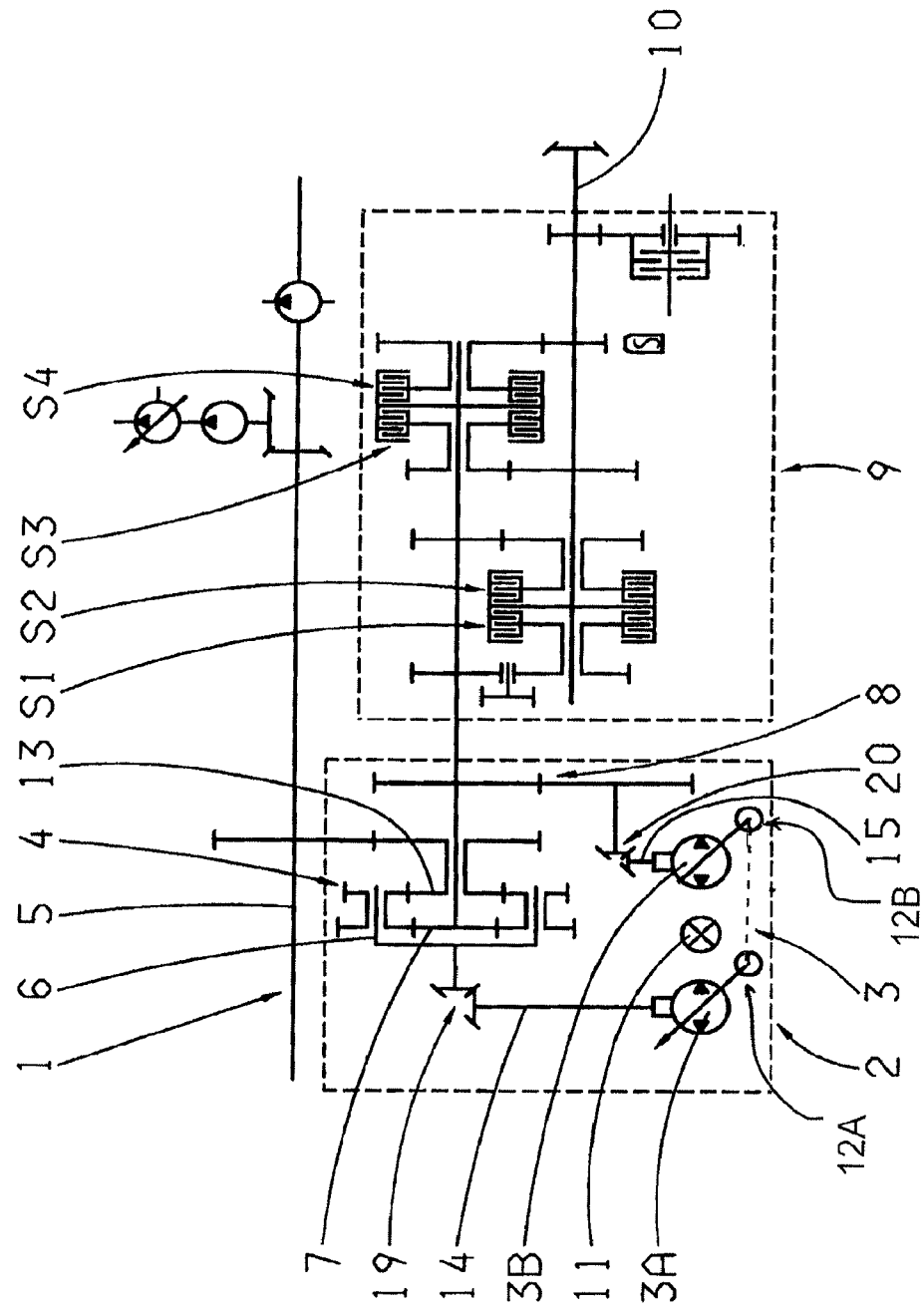
FIG. 3B shows a gear diagram of a second variation of the second exemplary embodiment of the transmission device according to the invention.

The variator shafts 14 and 15 are arranged at right angles to the shafts 6, 7 of the planetary gear set 4. The connection of the variator 3 to the planetary gear set 4 via the two angle drives 19 and 20 in a simple manner offers the possibility of arranging the variator 3 in the position shown in FIGS. 4 and 5 next to or above the planetary gear set 4, with a horizontal orientation of the variator 3. As shown in FIG. 3A, a cost-effective refinement of the transmission device, according to the invention, relates to a hydrostatic unit having at least one fixed displacement unit 3B'. As shown in FIG. 3B, according to another embodiment, the hydrostatic device comprises at least one adjustable pump unit and at least one adjustable motor unit that are adjustable independently of one another, via independent adjustors 12A, 12B.

Figure 4:
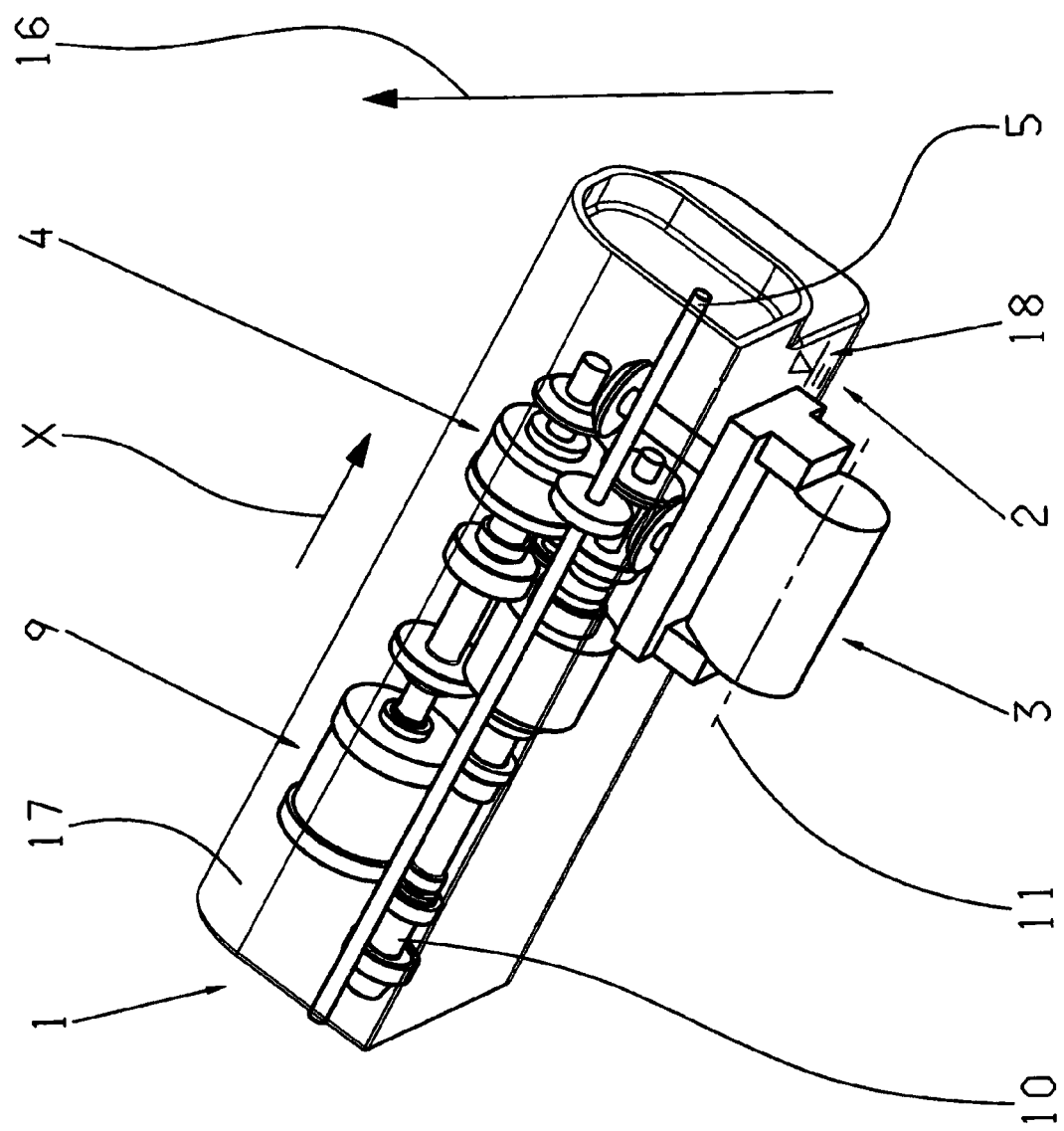
FIG. 4 shows a schematic three-dimensional side view of a first embodiment of the transmission device according to FIG. 3.
Figure 5:
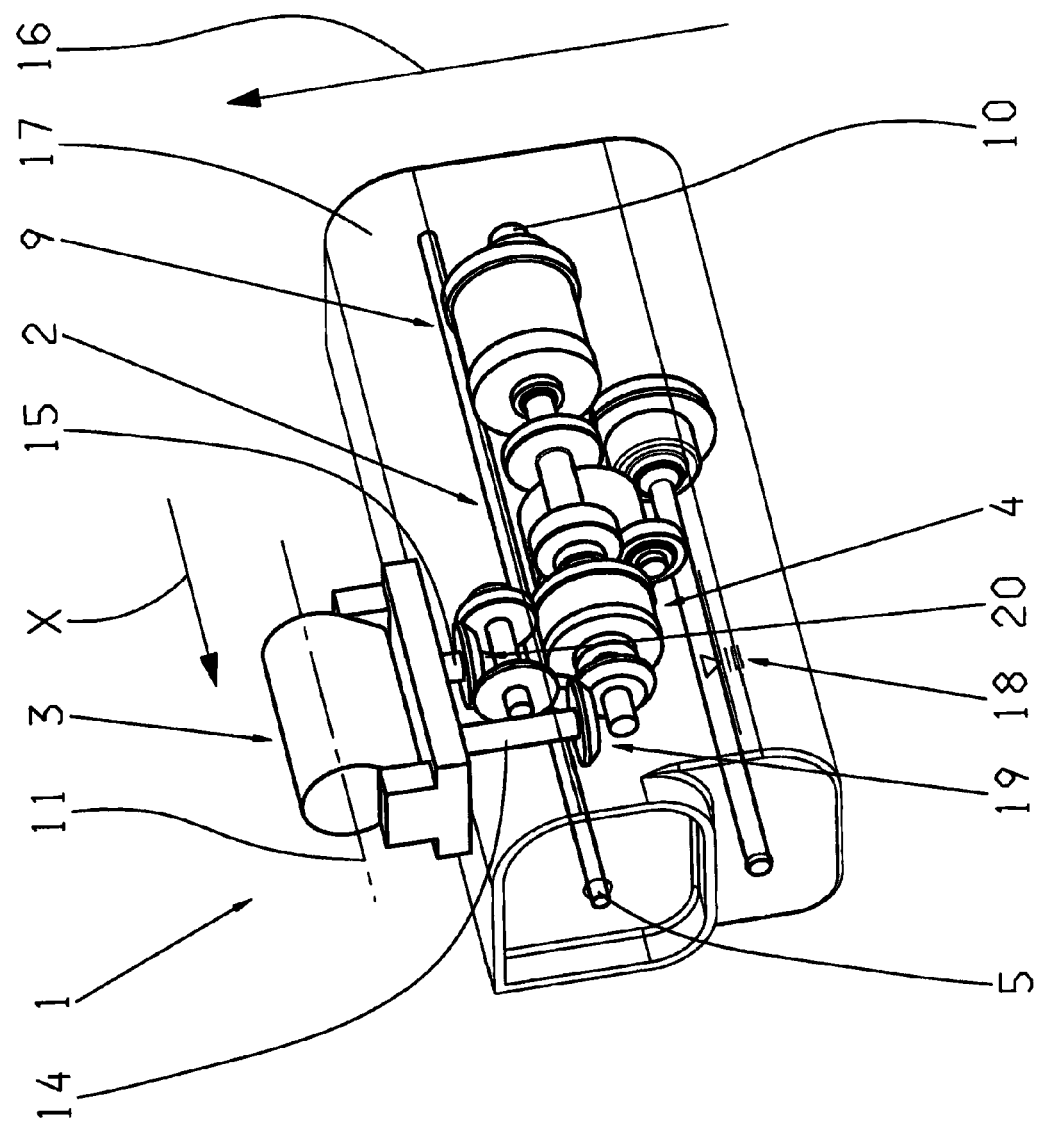
FIG. 5 shows a schematic three-dimensional side view of a second embodiment of the transmission device according to FIG. 3.

In comparison to the first exemplary embodiment represented in FIGS. 1 and 2, in which the variator 3 is connected via spur gear teeth to the shafts 6, 7 of the planetary gear set 4, the second exemplary embodiment of the transmission device 1 according to FIGS. 3 to 5 has a lower axial installation space requirement. In addition, the variator 3 in the first variant of the second exemplary embodiment of the transmission device 1 according to FIG. 4 can be pulled out of a plug connection and the bevel gear teeth of the angle drives 19 and 20 from one side of the vehicle during disassembly with little effort and without previously having to disassemble other vehicle components.

In the second variant, shown in FIG. 5, of the second exemplary embodiment of the transmission device 1 according to FIG. 3, introducing rotating components of the variator 3 into the oil sump of the transmission device 1 is avoided, and at the same time an axial installation space requirement is minimized and additional lateral space of the overall installation space is made available for the transmission device 1 due to a defined frame design of the vehicle frame 17.

Furthermore, oil that flows out of variator 3 due to leaks, a flushing oil volume flow and the like can be used in the embodiment of the transmission device 1 according to FIG. 5 to lubricate transmission components arranged underneath the variator 3 relative to the vertical vehicle axis 16.

With an appropriate arrangement of the transmission device 1 in the vehicle frame 17, it is easily possible to remove the variator 3 for service purposes upward relative to the vertical axis of the vehicle by tilting the driver's cab of the vehicle.

Depending on the respective application case, however, there is also the possibility of connecting the variator in the arrangement shown in FIGS. 1 and 2, via angle drives, to the planetary gear set 4.

Figure 6:
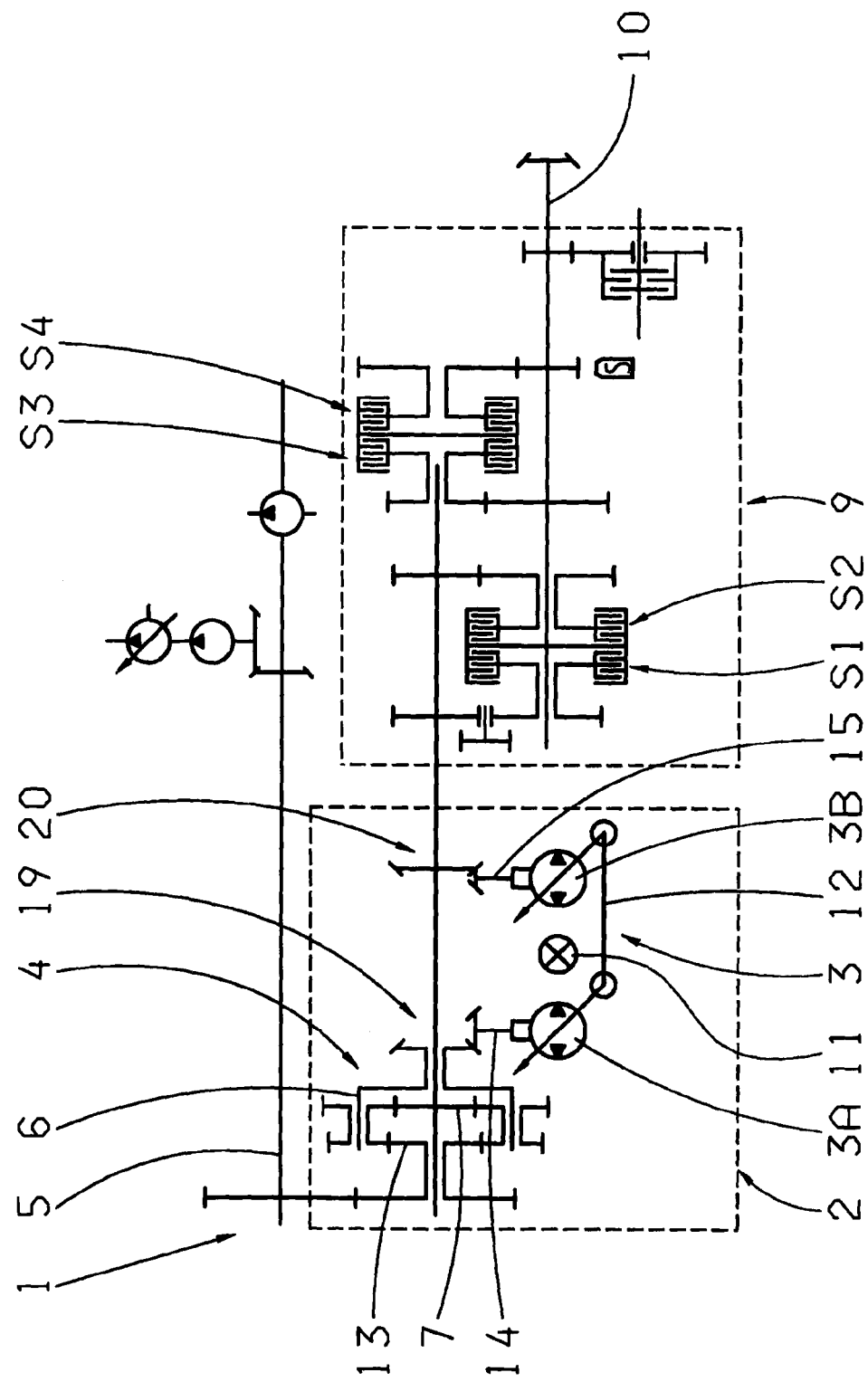
FIG. 6 shows a gear diagram of a third exemplary embodiment of the transmission device according to the invention.

Since the second embodiment of the transmission device 1 has an excessively large overall installation space requirement in the radial direction in certain circumstances, the variator 3 in the third exemplary embodiment shown in FIG. 6 is arranged between the planetary gear set 4 and the manual gearbox unit 9 in order to reduce the radial space requirement of the transmission device 1. The resulting increased axial installation space requirement for the transmission device 1 is usually available in the region of the drive train of agricultural machines, while the installation space available in the radial direction is often limited, so that the above-described arrangement of the variator 3 next to or above the planetary gear set 4 and/or the manual gearbox unit 9 is not possible.

Alternatively, the variator 3 in the fourth exemplary embodiment of the transmission device 1 shown in FIG. 7 is arranged spatially behind the manual gearbox unit 9 in the forward travel direction X, so that the manual gearbox unit 9 is arranged between the planetary gear set 4 and the variator 3, and the transmission device 1 has a smaller installation space requirement in the radial direction.

In principle, the power-split transmission device can be designed with other suitable variators such as a belt wrap variator, a friction-wheel variator or the like, in place of a variator designed as a hydrostatic unit, in order to be able to vary the gear ratio of the transmission device continuously and as a function of the operating state to the desired extent.

REFERENCE NUMBERS

1 Transmission device
2 Continuously variable drive set
3 Variator
3A Pump
3B Motor
4 Planetary gear set
5 Transmission drive shaft
6 Shaft, planet carrier
7 Shaft, sun gear
8 Spur gear teeth
9 Manual gearbox unit
10 Transmission output shaft
11 Pivot axis
12 Yoke
13 Second sun gear
14, 15 Variator shaft
16 Vertical vehicle axis
17 Vehicle frame
18 Oil level
19, 20 Angle drive
S1-S4 Shifting element
X Forward travel direction

The invention claimed is:

1. A transmission device (1) for a vehicle comprising:
a variator (3) that is axially longer than a width and a depth of the variator (3),
a planetary gear set (4),
a manual gearbox unit (9), and
a hydraulic system having an oil sump, and
following installation in the vehicle, the variator (3) being oriented such at a longitudinal extension thereof being at least approximately horizontally,
a first angled drive directly connecting a first variator shaft (14) of the variator (3) to a first shaft (6) of the planetary gear, and
a second angled drive (20) connecting a second variator shaft (15) of the variator (3) to a second shaft (7) of the planetary gear set,
wherein the planetary gear set comprises first and second sun gears (7, 13) and a common planet carrier (6), and only the second sun gear (13) directly drives a transmission drive shaft (5).

2. The transmission device according to claim 1, wherein the variator is arranged at least partially below an oil level of the oil sump and the portion of the variator, located below the oil level, is isolated from the hydraulic fluid by internal partitions (IP).

3. The transmission device according to claim 1, wherein the variator (3) is arranged above an oil level (18) of the oil sump.

4. The transmission device according to claim 1, wherein the variator (3) is a hydrostatic device.

5. The transmission device according to claim 4, wherein the hydrostatic device (3) comprises a bent-axis design and has at least one adjustment unit (3A, 3B).

6. The transmission device according to claim 4, wherein the hydrostatic device (3) comprises a swash plate design and has at least one adjustment unit (3A, 3B).

7. The transmission device according to claim 4, wherein the hydrostatic device (3) comprises at least one fixed displacement unit (3B).

8. The transmission device according to claim 4, wherein the hydrostatic device (3) has at least one adjustable pump and at least one adjustable motor which are adjustable independently of one another.

9. The transmission device according to claim 4, wherein the hydrostatic device (3) has at least one adjustable pump (3A) and at least one adjustable motor (3B) which are jointly adjusted with one another.

10. The transmission device according to claim 1, wherein the variator (3), following installation in the vehicle, is arranged spatially between a drive engine of the vehicle and the planetary gear set (4) and the manual gearbox unit (9).

11. The transmission device according to claim 1, wherein the variator (3) is arranged spatially between the planetary gear set (4) and the manual gearbox unit (9).

12. The transmission device according to claim 1, wherein the manual gearbox unit (9) is arranged spatially between the planetary gear set (4) and the variator (3).

13. The transmission device according to claim 1, wherein the variator (3), following installation in the vehicle and relative to a travel direction of the vehicle, is arranged spatially adjacent to at least one of the planetary gear set (4) and the manual gearbox unit (9).

14. The transmission device according to claim 1, wherein the variator (3), following installation in the vehicle, is arranged, relative to a vertical vehicle axis (16), above at least one of the planetary gear set (4) and the manual gearbox unit (9).

15. The transmission device according to claim 1, wherein the first shaft (6) of the planetary gear set and the second shaft (7) of the planetary gear set are concentric with respect to one another and both lie parallel to a transmission drive shaft (5).

16. The transmission device according to claim 1, wherein the planet carrier is integral with the first shaft (6) of the planetary gear set and the first sun gear is integral with the second shaft (7) of the planetary gear set.

* * * * *

UNITED STATES PATENT AND TRADEMARK OFFICE
CERTIFICATE OF CORRECTION

| | |
|---|---|
| PATENT NO. | : 8,414,439 B2 |
| APPLICATION NO. | : 12/679518 |
| DATED | : April 9, 2013 |
| INVENTOR(S) | : Karl Grad et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this
Twenty-third Day of July, 2013

Teresa Stanek Rea
*Acting Director of the United States Patent and Trademark Office*